US012567296B2

(12) United States Patent
Milewski

(10) Patent No.: US 12,567,296 B2
(45) Date of Patent: Mar. 3, 2026

(54) ELECTRONIC ACCESS CONTROL SYSTEM

(71) Applicant: VISUAL DATA PTY LTD, Sydney (AU)

(72) Inventor: Lloyd Milewski, Sydney (AU)

(73) Assignee: VISUAL DATA PTY LTD, Sydney (AU)

( * ) Notice: Subject to any disclaimer, the term of this patent is extended or adjusted under 35 U.S.C. 154(b) by 155 days.

(21) Appl. No.: 18/698,153

(22) PCT Filed: Oct. 7, 2022

(86) PCT No.: PCT/AU2022/051198
§ 371 (c)(1),
(2) Date: Apr. 3, 2024

(87) PCT Pub. No.: WO2023/056518
PCT Pub. Date: Apr. 13, 2023

(65) Prior Publication Data
US 2024/0420528 A1      Dec. 19, 2024

(30) Foreign Application Priority Data

Oct. 7, 2021      (AU) ................................. 2021903214

(51) Int. Cl.
*H04W 12/04*          (2021.01)
*G06Q 10/02*          (2012.01)
(Continued)

(52) U.S. Cl.
CPC ......... *G07C 9/00563* (2013.01); *G06Q 10/02* (2013.01); *G06Q 50/12* (2013.01);
(Continued)

(58) Field of Classification Search
CPC ........ G06F 21/32; G06Q 10/02; G06Q 10/06; G06Q 10/063; G06Q 50/12; G06V 40/161;
(Continued)

(56) References Cited

U.S. PATENT DOCUMENTS 9,887,992  B1 *   2/2018   Venkat .................... G06F 21/35
10,360,747 B2     7/2019   Wishne
(Continued)

FOREIGN PATENT DOCUMENTS

CN          111815833  A       10/2020

OTHER PUBLICATIONS

International Preliminary Report on Patentability (Chapter II) dated Nov. 13, 2023 from PCT Application No. PCT/AU2022/051198 (5 pp.).

(Continued)

*Primary Examiner* — Dionne Pendleton
(74) *Attorney, Agent, or Firm* — INNOVATION CAPITAL LAW GROUP, LLP; Vic Lin

(57) ABSTRACT

An electronic access control system is configured for check-in less access control wherein a code generator generates a booking specific optical computer readable media which is optically read by electronic door lock apparatus. Simultaneously, the electronic door lock apparatus captures facial image data for subsequent keyless entry. Access control parameters are encoded within the optical computer readable media and decoded directly therefrom by the electronic door lock apparatus so that the electronic door lock apparatus does not require Internet connectivity.

22 Claims, 2 Drawing Sheets

(51) Int. Cl.

| | |
|---|---|
| *G06Q 50/12* | (2012.01) |
| *G06V 40/16* | (2022.01) |
| *G07C 9/00* | (2020.01) |
| *G07C 9/25* | (2020.01) |
| *H04L 9/08* | (2006.01) |

(52) U.S. Cl.
CPC ....... *G06V 40/172* (2022.01); *G07C 9/00857* (2013.01); *G07C 9/00904* (2013.01); *G07C 9/25* (2020.01); *H04L 9/0825* (2013.01); *G07C 2009/00865* (2013.01); *G07C 2009/0088* (2013.01); *G07C 2209/08* (2013.01)

(58) Field of Classification Search
CPC .. G06V 40/171; G06V 40/172; G06V 10/147; G06V 40/10; G06V 40/117; G06V 40/13; G06V 40/1341; G07C 2009/00865; G07C 2009/0088; G07C 2209/08; G07C 9/00563; G07C 9/00857; G07C 9/00904; G07C 9/25; G07C 9/00309; G07C 2009/00769; G07C 2209/64; G07C 2009/00396; G07C 2009/00634; G07C 2009/00793; G07C 2209/63; G07C 9/00182; G07C 2009/0038; G07C 2009/00611; G07C 2009/00785; G07C 2009/00992; G07C 9/22; G07C 9/26; G07C 2209/04; G07C 9/00571; G07C 9/20; G07C 9/21; G07C 9/27; G07C 9/28; G07C 2009/00412; G07C 2209/65; G07C 2009/00373; G07C 2009/00642; G07C 2209/62; G07C 2009/00579; G07C 2009/00603; G07C 2009/00753; G07C 2009/00761; G07C 2009/00952; G07C 2009/00984; G07C 2209/14; G07C 9/00658; G07C 9/00912; G07C 9/00944; G07C 9/257; H04L 9/0825; H04L 9/0894; H04L 9/3236; H04L 9/3247; H04L 63/0823; H04L 9/3268; H04L 63/0442; H04L 63/108; H04L 9/3263; H04L 2209/80; Y10T 70/7876; E05Y 2201/10; E05Y 2400/612; E05Y 2400/664; E05Y 2400/86; G07F 9/10; E05B 15/006; E05B 47/0002; E05B 47/0603; E05B 47/0657; E05B 5/003; E05B 63/121; E05B 17/0087; E05B 17/2011; E05B 19/04; E05B 2035/009; E05B 2047/0024; E05B 2047/0096; E05B 35/00; E05B 47/0012; E05B 47/00; G08B 25/003; G08B 25/008; H04W 12/02; H04W 12/033; H04W 12/068; H04W 12/069; H04W 12/082; H04W 12/084; H04W 12/04; H04W 12/06; H04W 4/80; B60R 2325/101; B60R 25/01; B60R 25/252; B60R 25/31
See application file for complete search history.

(56) References Cited

U.S. PATENT DOCUMENTS

| | | | | |
|---|---|---|---|---|
| 2009/0066476 | A1* | 3/2009 | Raheman ........... | G07C 9/00904 |
| | | | | 455/556.1 |
| 2017/0061560 | A1* | 3/2017 | Bullard ................. | G06Q 50/26 |
| 2018/0262891 | A1* | 9/2018 | Wu ...................... | H04W 12/065 |
| 2018/0342329 | A1 | 11/2018 | Rufo et al. | |
| 2019/0147676 | A1 | 5/2019 | Madzhunkov et al. | |
| 2021/0201609 | A1 | 7/2021 | Amuduri et al. | |
| 2021/0272403 | A1* | 9/2021 | Eathakota ................ | G07C 9/28 |
| 2022/0028194 | A1* | 1/2022 | Grzenda ................. | E05B 67/22 |
| 2022/0201492 | A1* | 6/2022 | Park .................... | H04L 63/0861 |
| 2023/0222856 | A1* | 7/2023 | Chen ..................... | G06V 40/16 |
| | | | | 382/118 |

OTHER PUBLICATIONS

International Search Report & Written Opinion dated Jan. 6, 2023 from PCT Application No. PCT/AU2022/051198 (10 pp.).

* cited by examiner

ELECTRONIC ACCESS CONTROL SYSTEM

FIELD OF THE INVENTION

This invention relates generally to an electronic access control system for controlling check-in less room access.

BACKGROUND OF THE INVENTION

Accommodation reservation systems typically comprise a reservation interface through which guests may reserve accommodation.

Once the booking is made, the guest typically attends reception to obtain an electronic key to gain access to the reserved room.

U.S. Pat. No. 10,360,747 B2 (Wishne) 23 Jul. 2019 discloses a system to expedite this process which allows a hotel guest to authenticate her passive smart device (e.g., a payment card having NFC, BLE, or RFID technologies) and use it to access her hotel room.

To accomplish this, the system receives an authentication request from a computing device (e.g., the hotel guest's smart phone or personal computer) which includes an identification ("ID") data associated with the passive smart device.

If the request is valid, the system stores the ID data associated with the passive smart device.

As such, the passive smart device is authenticated and may be used to unlock the electronic lock.

The disadvantage of this system however is that guests are required to carry passive smart devices.

Another disadvantage of this system is that electronic door locks need to be connected to the Internet to verify IDs of authorised passive smart device.

US 2019/0147676 A1 (Madzhunkov et al.) 16 May 2019 discloses a system which can offer keyless entry.

According to the process shown in FIG. 18 of Madzhunkov et al., the system can operate in a first mode wherein the system allows access using a badge and a second mode allowing access using facial data stored from the first mode.

However, the system is not suitable for controlling reservation access such as for hotel rooms and which would require electronic door lock Internet connectivity to determine whether a guest with a badge or a recognised guest is authorised to enter a room or similar accommodation.

It is to be understood that, if any prior art information is referred to herein, such reference does not constitute an admission that the information forms part of the common general knowledge in the art, in Australia or any other country.

SUMMARY OF THE DISCLOSURE

There is provided herein an electronic access control system which has a code generator configured for generating optical computer readable media.

The code generator is typically connected to an online reservation system to automatically generate optical computer readable media for online bookings.

The code generator is configured to encoding access parameters derived from bookings in the computer readable media. These access parameters comprise a validity period depending on the booking.

Other control parameters may be encoded by the code generator also which are derived from the booking, such as number of guests, time of day allowable entry periods, check-in and checkout times, ability to use peripheral electronic devices (such as minibars) and the like.

The system further comprises an electronic door lock apparatus comprising a lock controller, a memory device, a camera controlled by the lock controller to obtain image data and an electronic lock controller by the lock controller The system is configured to operate in a code reading mode wherein guests can gain entry using an optical computer readable media obtained from an online reservation which may be printed on a piece of paper or displayed on the screen of a mobile phone.

In the code reading mode, the lock controller obtains optical computer readable media image data from the optical computer readable media using the camera.

The lock controller then decodes the access parameters directly from the image data without requiring Internet data connectivity. The lock controller stores the access parameters in the memory device.

Simultaneously, so that the guest can subsequently gain access without the optical computer readable media, the lock controller obtains facial image data of the guest using the camera and stores a facial data profile in the memory device.

As such, for subsequent entries, the lock controller operates in a code reading bypass mode wherein the guest can gain access to the room using facial recognition alone.

In the code reading bypass mode, the lock controller obtains facial image data using the camera and, if the facial image data matches the facial data profile, the lock controller selects the stored access parameters associated with the facial data profile from the memory device.

The lock controller controls the electronic lock according to the access parameters. Specifically, the controller would only allow access during validity period. Access may be further controlled according to further control parameters, such as number of guests, check-in or checkout times and the like.

The present system therefore allows for booking specific check-in less access control without the disadvantages of guests having to carry access keys and without requiring electronic lock Internet connectivity. The present system also allows guests to gain check-in less access using the optical computer readable media downloaded at the time of making the reservation.

In embodiments, the system may allow for updating of reservations wherein, for example, a guest may extend a stay using an online interface to obtaining an updated computer readable media which is further processed by the lock controller to supersede the access parameters stored thereby.

When gaining entry, the other control parameters may be used by the lock controller to control peripheral electronic devices, such as minibar locks, aircon functionality, television functionality and the like.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
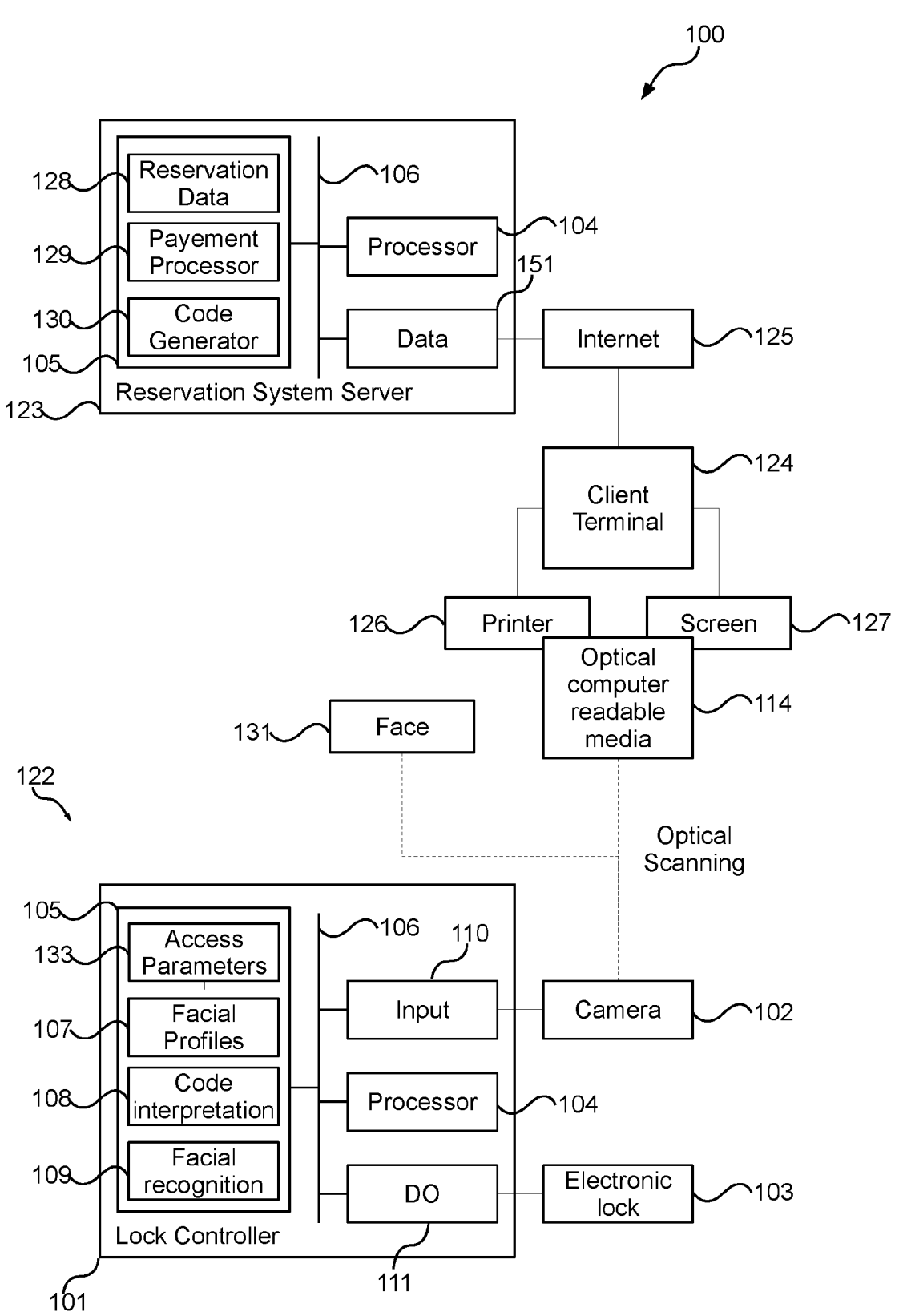
FIG. 1 shows an electronic access control system in accordance with an embodiment.

FIG. 1 shows an electronic access control system 100 in accordance with an embodiment.

The system 100 may typically comprise a reservation system server 123, preferably configured for taking online bookings across the Internet 125 from client terminals 124. However, it should be appreciated that reservations can be made in other manners, including by way of reception desk reservation.

The system 100 further comprises electronic door lock apparatus 122 comprises a lock controller 101.

The server 123, client terminal 124 and/or the lock controller 101 comprises a processor 104 for processing digital data. A memory device 105 in operable communication with the processor 104 via a system bus 106 stores digital data including computer program code instructions. In use, the processor 104 obtains these computer program code instructions and associated data for interpretation and execution of the computational functionality described herein.

With reference to the lock controller 101, the data may comprise a facial profile 107. The facial profiles 107 are usable for recognising faces. In this regard, the facial profiles 107 may comprise facial image data which is used by the lock controller 101 to recognise facial features on-the-fly. Preferably however, to minimise storage space within the memory device 105 of the lock controller 101, the facial profiles 107 comprises facial characteristic data.

Such facial characteristic data may comprise geometric data such distances between geometric features, such as spacing between the eyes, nose and mouth, lips, ears and the like. The geometric data may further comprise a depth profile data representing the contours of a face. In embodiments, the facial characteristics may comprise other types of data, including colorimetric data including skin tone, eye colour hair, and the like. Yet further, the geometric data may represent bodily geometric data such as height, width of a person's body, head or the like.

Furthermore, the computer program code instructions may be logically divided into a plurality of computer program code instruction controllers, including a code interpretation controller 108. As will be described in further detail below, the code interpretation controller 108 is configured for decoding access parameters from optical computer readable media 114.

The controllers may further comprise a facial recognition controller 109. As will be described in further detail below, the facial recognition controller 109 is configured for recognising faces 131 by matching facial data obtained from a camera 102 of the door lock apparatus 122 against one or more facial profiles 107 stored within the memory device 105.

The controller 101 may comprise an input 110 interfacing the camera 102 and a digital output 111 interfacing an electronic door lock 103, such as an electronic strike lock.

The reservation system server 123 may store reservation data 128 within the memory device 105 thereof. The server 123 may have a payment processor controller 129 configured for processing electronic transactions associated with reservations.

Furthermore, the server 123 comprises a code generator controller 130 configured to generate optical computer readable media 114 for each reservation.

Exemplary processing 112 of the system 100 will now be described with reference to FIG. 2 with reference to the application of the system 100 for check-in less hotel room access. However, it should be appreciated that the system 100 is not limited to this particular application and wherein the system 100 may be used for other types of keyless and check-in less access control, including for resort room reservations, private dwelling reservations and the like.

At step 132, the system 100 configures the reservation. Specifically, a guest may browse to a reservation webpage served by the reservation system server 123 and book a single hotel room for two people for two nights, checking in on 23 September and checking out on 25 September. The guest further specifies that the guest would like minibar access.

At step 137, the code generator controller 130 of the server 123 generates optical computer readable media 114 associated with the booking.

Specifically, the server 123 generates access parameters 133 associated with the booking. The access parameters 133 comprise a validity period 134, in this case, from 23 September to 25 September.

The access parameters 133 may further comprise other control parameters 135.

These other control parameters 135 may be booking specific or venue specific.

For example, venue specific control parameters 135 may specify that check-in is after 3 PM and checkout is prior to 10 AM.

Furthermore, booking specific control parameters 135 may comprise peripheral electronic device control parameters which, for example, the may specify that the guest is allowed minibar access.

These access parameters 133 are encoded at step 136 by the code generator controller 130.

The optical computer readable media 114 is provided to the guest to allow for check-in less access.

As is illustrated in FIG. 1, the optical computer readable media 114 may be downloaded to the client terminal 124 from the server 123 and either printed on a piece of paper using the printer 126 or displayed on a screen 125 of a mobile phone or the like.

At step 138, the lock controller 101 detects motion 138. To save power, the locking controller 101 may defaults to a sleep state and wakes from the sleep state at step 139 when detecting motion using the camera 102 or, in embodiments, a separate motion sensor.

At step 139, the controller 101 obtains image data using the camera 102.

Figure 2:
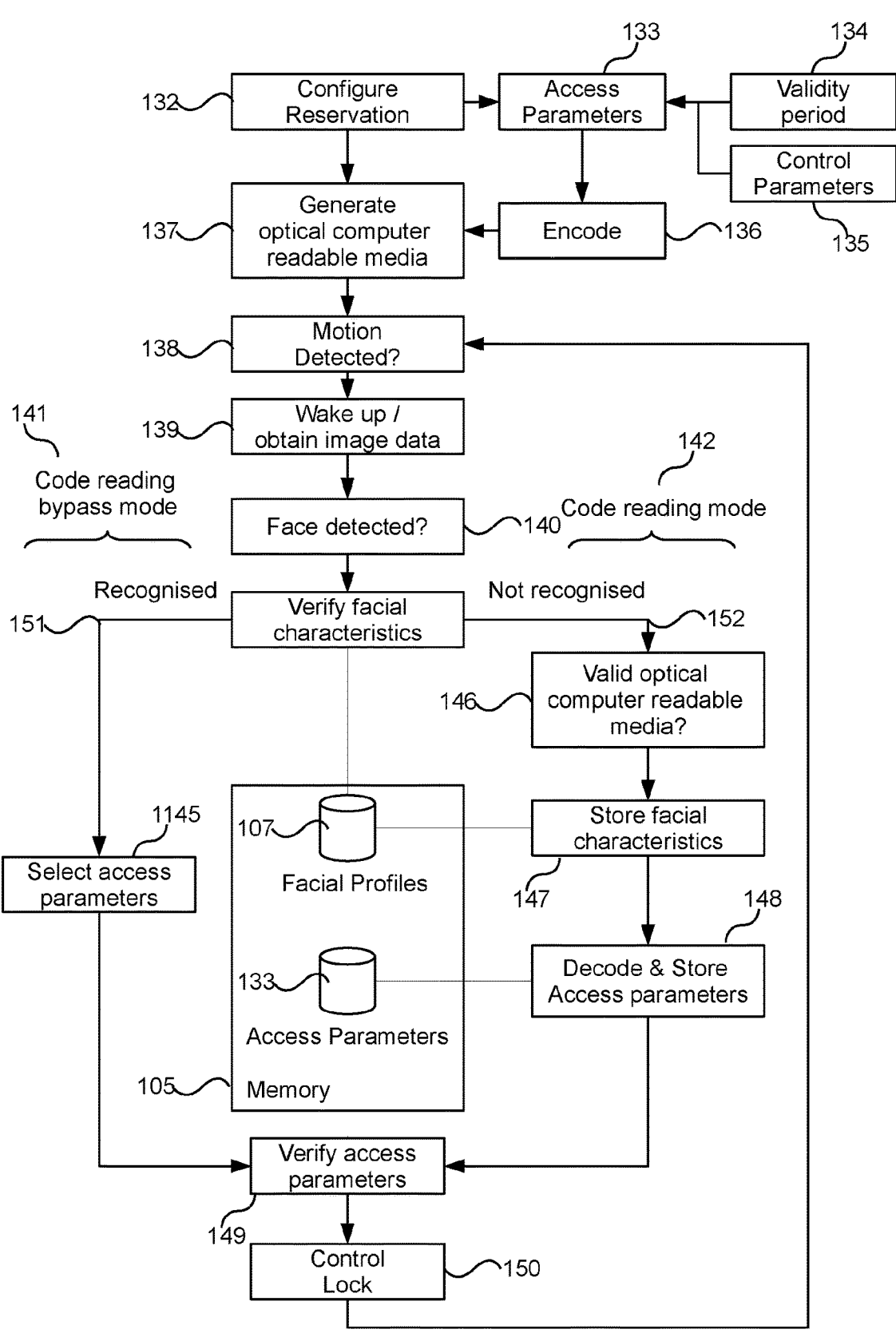
FIG. 2 to shows exemplary processing by the system of FIG. 1.

For first time access, the controller 101 operates in the code reading mode 142 shown in FIG. 2.

As such, when arriving at the door, the guest would present the piece of paper or mobile phone screen 127 having the optical computer readable media 114 thereon in front of the camera 102.

The lock controller 101 may analyse the image data to determine whether to operate in the code reading mode 142 or the code reading bypass mode 141.

In embodiments, the lock controller 101 may determine whether a face is detected within the image data at step 140. The controller 101 may employ any one of a known facial detection technique to identify if a face is detected within the image data.

If a face is detected, the lock controller 101 may progress to verifying facial characteristics at step 143.

When verifying facial characteristics at step 143, the lock controller 101 would compare facial data obtained from the image data with the facial profiles 107 stored within the memory device 105 thereof.

However, as this is first time access for the guest, the controller 101 will either not detect a face at step 140 (because the guest is holding a piece of paper in front of the camera 102) or, if the guests face is visible, the lock controller 101 would not recognise the face at step 143.

As such, processing proceeds via path 152 wherein a face is not recognised step 146 wherein the controller 101 verifies the optical computer readable media 114.

In a preferred embodiment, the optical computer readable media 114 comprises a 2D code (QR™ code). However, other types of optical computer readable media able to encoded data may be used.

The media 114 may encode verification data such as a checksum or the like which is verified by the lock controller 101.

If the controller 1010 determines that the media 114 is valid, the controller 101 is configured to decode the access parameters 133 therefrom at step 148 and store the access parameters 133 in the storage device 105.

Simultaneously, the controller 101 would create a facial profile 107 for the guest according to facial characteristics of facial image data obtained from the image data.

The lock controller 101 may comprise an audio output device which plays out audio instructions to the guest. For example, the controller 101 may play out audio instructing the guest to please present her face in front of the camera 102. The audio instructions may be configured according to whether the controller 101 is able to obtain the facial image data or not. For example, the controller 101 is able to detect the facial image data within the image data obtained by the camera 102, the controller 101 would not need to play out such instructional audio.

However, if the guests face is not visible, or is obscured by the computer printout or the like, the controller 101 may play out audio instructing the guest to present her face in front of the camera 102.

The controller 101 may further analyse the facial image data to provide further instructions, such as wherein, if the controller 101 detects that the facial region is too small, the controller 101 may instruct the guest to stand closer to the camera 102.

The controller 101 may be configured to ensure that a proper facial profile 107 may be obtained. For example, if lighting is too low, or if the guest's face is obscured with a balaclava, cap or the like, the controller 107 would not store the facial profiles. This would mean that the guest would need to subsequently use the optical computer readable media 114 to gain access until such time that a facial profile 107 can be built of the guest.

The access parameters 133 are stored in memory 105 in relation to the facial profile 107 created for the guest. In this way, the appropriate access parameters 133 may be selected by the controller 101 when subsequently recognising a guest as will be described in further detail below.

At step 149, the controller 101 verifies the access parameters 149 to determine how to control the lock at step 150.

The controller 101 may compare the validity period 134 to the current date and only unlocks the lock 103 during the validity period decoded from the computer readable media 146.

As alluded to above, the control parameters 135 may be further verified by the controller 101 to allow or deny access. For example, the controller 101 may deny access the prior a check-in time decoded from the media 114.

In embodiments, the controller 101 may be in operable communication with peripheral electronic devices via an interface, such as a minibar door lock (not shown). Each peripheral electronic device may be associated with an identifier so that the controller 101 can control the peripheral electronic device accordingly.

For example, the media 114 may encode that the guest has minibar access and wherein the media 114 encodes the identifier of the minibar lock and the operational state thereof (i.e., locked or unlocked). As such, the lock controller 101 may transmit control instructions to the minibar lock via wireless (such as Bluetooth) or wired interface so that the minibar is unlocked for the duration of the guests stay.

This process may be used to control other types of electronic peripherals, such as air-conditioning devices, televisions and the like.

For subsequent entry to the room, the guest need not use the media 114 wherein the controller 101 operates in the code reading bypass mode 141.

Specifically, when subsequently arriving at the door, the system 100 would again commence the process by detecting motion at step 138.

However, at step 143, the controller 101 would recognise a facial profile 107 within the storage device 105.

As such, the processing would take path 151 wherein the face 131 of the guest is recognised.

As such, at step 145 the lock controller 101 would select the access parameters 133 specific to the booking which are then verified at step 149 to control the lock at step 150.

In embodiments, the controller 101 may be configured to store logs of successful or non-successful verifications within memory 105. The logs may record date and time and details from the optical computer readable media 114, including an ID thereof.

At step 149, the controller 101 may store more than one facial profile 107. For example, the control parameters 135 may specify that two guests are allowed access to the room. As such, at step 147, the controller 101 would go through a process of obtaining facial profiles 107 for each guest that each guest can subsequently enter the room without the media 114. Similarly, the controller 101 may play out audio instructions, instructing each guest to present their face in front of the camera 102.

The access parameters 133 may be stored in encrypted format which is decoded by the lock controller 101, such as by using asymmetric key cryptography.

For example, the access parameters 133 may be encrypted using a public key of an asymmetric key pair by the code generator 130 which can only be decoded by a corresponding private key held by the lock controller 101. As such, the code generator 130 may unique store public keys for each lock controller 101 and wherein each controller 101 stores a corresponding private key to decode the access parameters.

The controller 101 may be configured to only enter the code reading bypass mode 141 after a number of successful verifications using the optical computer readable media 114. For example, after having gained entry to 3 times, the controller 101 may move to the code reading bypass mode 141. Each time, the controller 101 may obtain facial characteristics or facial image data to enhance accuracy or facial detection.

Alternatively, as alluded to above, the controller 101 may be configured to only enter the code reading bypass mode 141 if a suitable facial profile 107 is obtained.

In embodiments, the lock controller 101 is configured to store authorised user facial profiles to allow access of authorised personnel, such as cleaning staff, managers and the like. According to this embodiment, the controller 101 may be securely placed in a training mode wherein the controller 101 records the authorised user facial characteristics. As such, subsequently, even whilst in the code reading mode 142, the controller 101 may allow access to users matching the authorised user facial characteristics.

The lock controller 101 may automatically revert from the code reading bypass mode 141 back to the code reading mode 142 upon expiry of the validity period 134.

In embodiments, the lock controller 101 may comprise a short-range wireless communication interface (such as a Bluetooth communication interface) for verifying the presence of a guest mobile phone for enhanced authorisation. This additional verification may complement the scanning of the optical computer readable media 114.

In embodiments, additional characteristics may be captured by the controller 101 for enhanced recognition purposes, such as wherein the controller 101 comprises a microphone (not shown) which records audio at step 147 to build an audio profile which is subsequently verified at step 143 against stored audio profiles using audio recognition techniques. Audio recognition may be used to enhance optical facial recognition to mitigate against attempted spoofing wherein an unauthorised person presents a picture of an authorised person in front of the camera 102.

In embodiments, the optical computer readable media 114 may be superseded by updated optical computer readable media 114. For example, an updated optical computer readable media 114 may be issued with updated access parameters 133. In accordance with this embodiment, the media 114 may store a booking ID which is stored by the lock controller 101 within memory 105.

As such, when storing the access parameters 133 at step 148, the controller 101 may determine whether a booking exists within memory 105 and, if so, update the existing access parameters.

As such, if the guest wishes to extend their stay by a further day, they can do so online to obtain an updated optical computer readable media 114 which may be presented to the lock controller 101 to extend the validity period 134 stored thereby.

In embodiments, the optical computer readable media 114 may allow access through more than one door. In other words, the system 100 may comprise more than one lock controller 101 each of which is able to control a respective electronic lock 103 according to the optical computer readable media 114.

For example, a hotel may comprise a front door and a room door. In a similar manner as outlined above, a guest may train each door by going through the code reading mode 142 of each lock controller 101 so that each lock controller 101 can subsequently operate in the code reading bypass mode 141.

In alternative embodiments, the computer readable media 114 may be limited to one or a set of doors. For example, each lock controller 101 may be associated with a unique identifier and wherein identifiers of authorised lock controllers 101 are encoded within the optical computer readable media 114. For example, the code generator 130 may encode the optical computer readable media 114 to specify that the guest is able to gain access to the hotel room, the front door, but not the canteen door.

As such, when decoding the computer readable media at step 146, the lock controller 101 may ascertain whether the lock controller identifier encoded by the computer readable media 114 matches the allocated identifier of the lock controller.

In embodiments, different access parameters 133 for different doors may be encoded in one optical computer readable media 146. For example, the code generator 130 may encoded data structure within the optical computer readable media 114 comprising an array of access parameters each stored association with a respective door lock controller identifier.

As such, when decoding the optical computer readable media 114 at step 148, the controller 101 would only store the access parameters 133 matching its identifier. In this way, for example, the code generator 130 may encode the optical computer readable media 114 so that a guest can access a room at all hours but only gain access through the canteen door between 8 AM and 9 PM.

Whereas operation of the minibar and other electronic peripherals of the (such as televisions, air-conditioning devices and the like) was described above as being controlled by the controller 101, in embodiments, the minibar itself may for example comprise its own lock controller 101 and wherein the optical computer readable media 114 comprises access parameters for both the room door and the minibar door.

In embodiments, the code generator 130 may encode a booking identifier, hotel (or other venue) identifier, one or more door identifiers and the validity period 134. The validity period 134 may be specified as a start date or datetime value and an end date or datetime value.

As alluded to above, the control parameters 135 may also be encoded in the optical computer readable media 114. As also alluded to above, the control parameters 135 may encode the number of guests of a reservation to allow the lock controller 101 to create facial profiles 107 accordingly.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. An electronic access control system comprising:
a code generator configured for generating optical computer readable media, the optical computer readable media encoding access parameters, the access parameters comprising a validity period;
electronic door lock apparatus comprising:
a lock controller,
a memory device,
a camera controlled by the lock controller to obtain image data; and
an electronic lock controlled by the lock controller, wherein the lock controller is configured to operate in:
a code reading mode wherein:
the lock controller obtains optical computer readable media image data from the optical computer readable media using the camera the lock controller is configured to supersede the optical computer readable media with updated optical computer readable media;

decodes the access parameters from the image data;

stores the access parameters in the memory device;

obtains facial image data using the camera;

stores a facial data profile in the memory device; and a code reading bypass mode following the code reading mode wherein the lock controller:

obtains facial image data using the camera;

if the facial image data matches the facial data profile, selects the access parameters associated with the facial data profile from the memory device, and wherein:

the lock controller controls the electronic lock according to the validity period of the access parameters decoded from the optical computer readable media.

2. The system as claimed in claim 1, wherein the code generator interfaces a reservation system and wherein the code generator generates the optical computer readable media for a reservation configured by the server.

3. The system as claimed in claim 2, wherein the reservation system is configured to allow downloading of the optical computer readable media to a client terminal.

4. The system as claimed in claim 1, wherein the optical computer readable media further encodes other access control parameters.

5. The system as claimed in claim 4, wherein the other control parameters are venue specific.

6. The system as claimed in claim 5, wherein venue specific control parameters comprise at least one of a check-in time and a checkout time.

7. The system as claimed in claim 4, wherein the other control parameters are booking specific.

8. The system as claimed in claim 7, wherein booking specific control parameters comprise peripheral electronic device control parameters.

9. The system as claimed in claim 8, wherein the system further comprises a peripheral electronic device interface which is controlled by the lock controller depending on the peripheral electronic device control parameters.

10. The system as claimed in claim 1, wherein the locking controller defaults to a sleep state and wakes from the sleep state at step when detecting motion.

11. The system as claimed in claim 1, wherein the optical computer readable media comprises a 2D code.

12. The system as claimed in claim 1, wherein, when the lock controller is attempting to generate the facial data profile, the lock controller plays out audio using an audio output device depending on whether the lock controller is able to detect a face from the image data.

13. The system as claimed in claim 1, wherein the controller is configured to store a number of facial profiles according to a number of guests encoded by the computer readable media.

14. The system as claimed in claim 1, wherein the access parameters are encoded in encrypted format in the optical computer readable media which are decoded by the lock controller.

15. The system as claimed in claim 14, wherein the access parameters are encrypted by the code generator using a public key specific to the lock controller and wherein the lock controller stores a corresponding private key.

16. The system as claimed in claim 15, wherein the code generator stores unique public keys for a number of lock controllers and wherein each lock controller stores a respective private key.

17. The system as claimed in claim 1, wherein the lock controller is configured to store authorised user facial profiles to allow access of authorised personnel.

18. The system as claimed in claim 17, wherein the controller can be securely placed in a training mode wherein the controller records the authorised user facial profiles.

19. The system as claimed in claim 1, wherein the controller interfaces a microphone to records audio to store an audio profile which is used to verify the facial data profile.

20. The system as claimed in claim 1, wherein the optical computer readable media and the updated optical computer readable media store a booking ID which is stored by the lock controller within memory and, when storing the access parameters controller determines whether a booking exists within memory and, if so, updates existing access parameters.

21. The system as claimed in claim 1, wherein the system comprises a plurality of electronic door lock apparatus having respective plurality of lock controllers and wherein the plurality of lock controllers are each independently configurable by a same computer readable media.

22. The system as claimed in claim 21, wherein the computer readable media encodes plurality of lock controller identifiers and access parameters associated with each lock controller identifier and wherein, when storing the access parameters, each lock controller stores access parameters associated with its respective identifier.

* * * * *